US007050193B1

(12) United States Patent
Downing

(10) Patent No.: US 7,050,193 B1
(45) Date of Patent: May 23, 2006

(54) HIGH ACCURACY SWATH ADVANCE PAPER POSITIONING FOR PRINTERS

(75) Inventor: Steven P Downing, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/496,451

(22) Filed: Feb. 2, 2000

(51) Int. Cl.
*G06F 15/00* (2006.01)
*G06K 1/00* (2006.01)

(52) U.S. Cl. ........................ 358/1.2; 358/1.1; 358/1.16; 382/151; 382/112; 382/184

(58) Field of Classification Search ............... 358/1.12, 358/1.15, 3.32, 1.18, 1.9, 1.14, 1.16, 1.2, 358/1.1; 382/151, 152, 184, 193, 112
See application file for complete search history.

(56) References Cited

U.S. PATENT DOCUMENTS 4,716,638 A 1/1988 Ampferer .................. 29/156.4
4,734,868 A * 3/1988 DeLacy ..................... 358/1.12
4,916,638 A * 4/1990 Haselby et al. ............ 358/1.15
5,297,017 A * 3/1994 Haselby et al. ............... 347/19
5,479,062 A * 12/1995 Yoshino ................ 310/316.03
5,689,294 A 11/1997 Karz et al.
6,334,677 B1 * 1/2002 Wen et al. .................. 347/101

OTHER PUBLICATIONS

European Search Report, Jun. 9, 2001.

* cited by examiner

*Primary Examiner*—David Moore
*Assistant Examiner*—Thierry L. Pham

(57) ABSTRACT

Techniques for high accuracy media positioning in a swath printer. A high accuracy media positioning method includes mounting a computer-controlled printing element for movement along a swath axis for swath printing of an image on a print medium, moving the printing element along the swath axis and printing at least a portion of a swath of the image on the print medium, sensing the position of an edge of the just printed portion of the image which is nominally aligned with the scan axis; providing relative motion between the print medium and the printing element to accurately position the printing element in dependence on the sensed position of the edge of the just printed portion of the image. The fine compensation needed to compensate positioning errors can be performed prior to printing a swath, or even "on the fly" during the printing of a swath. Coarse positioning errors can be measured by the sensor and compensated by use of the printer media advance system, by increasing or decreasing as appropriate the nominal commanded swath-to-swath advance distance.

28 Claims, 10 Drawing Sheets

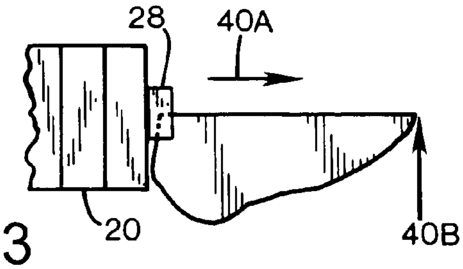
FIG. 3
FIG. 4A
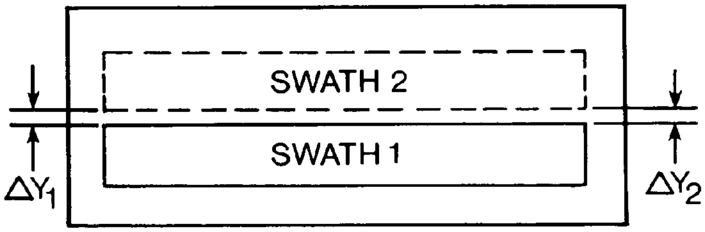
FIG. 4B
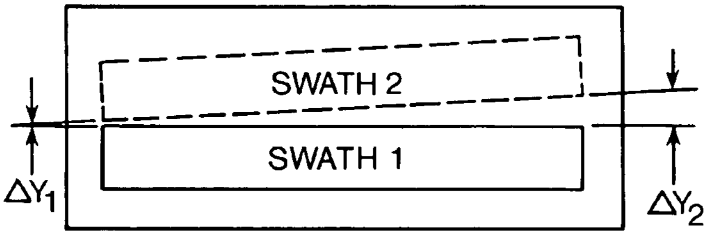
FIG. 4C
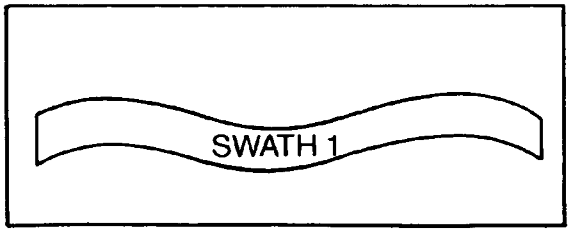

HIGH ACCURACY SWATH ADVANCE PAPER POSITIONING FOR PRINTERS

TECHNICAL FIELD OF THE INVENTION

This invention relates to swath printing systems, and more particularly to techniques for high accuracy swath advance media positioning.

BACKGROUND OF THE INVENTION

Accurately advancing paper between print swaths is becoming a greater and greater challenge. In early inkjet printers, the swath advances were short and the allowable error large. With the push to improve print quality and speed, the swath advances are getting larger and at the same time the accuracy needs to be greater. This invention provides accurate pen/paper positioning regardless of the length of swath advance.

Early inkjet printers relied on stepper motor position through a gear train to a drive shaft with rubber wheels to position the paper. This was adequate for the small advances and the coarse large dots. Subsequent improvements in swath advances have been accomplished using higher precision gears, micro-stepping, and drive rollers with lower run-out.

More recently an encoder has been added to the drive roller shaft to get direct feedback of drive shaft and reduce the requirement for precision gears. A second encoder is typically needed to compensate for eccentricity of the encoder disk. In addition, the manufacturing variation in the drive tire diameter may require a calibration routine to measure the drive tire circumference. This information is stored in non-volatile RAM and used to further improve the swath advance accuracy.

All these improvements have helped to meet the requirements for each new generation of printer. With the precision required for the next generation products, the existing technologies are again exceeded.

The swath advance distances can be expected to increase substantially. At the same time the number of dots per inch is increasing, e.g. from 600 dpi to 1200 dpi. In the past, system paper swath advance accuracies on the order of ½ to ¼ dot row have been required. To position paper to +/−0.0002 inches for paper advances greater than one inch would be difficult to achieve using conventional techniques.

SUMMARY OF THE INVENTION

Techniques are described for high accuracy media positioning in a swath printer. According to one aspect of the invention a high accuracy media positioning method includes mounting a computer-controlled printing element for movement along a swath axis for swath printing of an image on a print medium, moving the printing element along the swath axis and printing at least a portion of a swath of the image on the print medium, sensing the position of an edge of the just printed portion of the image which is nominally aligned with the scan axis; providing relative motion between the print medium and the printing element to accurately position the printing element in dependence on the sensed position of the edge of the just printed portion of the image.

The fine compensation needed to compensate positioning errors can be performed prior to printing a swath, or even "on the fly" during the printing of a swath. Coarse positioning errors can be measured by the sensor and compensated by use of the printer media advance system, by increasing or decreasing as appropriate the nominal commanded swath-to-swath advance distance.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 is a diagrammatic view illustrating how the carriage sensor detects the swath edge.

FIGS. 4A–4C illustrate different types of swath errors.

DETAILED DESCRIPTION OF THE PREFERRED EMBODIMENTS

This invention involves a major paradigm shift in the way a print medium is positioned for each swath. This invention recognizes that a critical task in high accuracy alignment is not in moving the paper accurately, but rather in lining up the bottom of the last swath with the top of the next swath. Existing media advance technologies can readily position the print medium to within +/− 0.001 inch. Higher positioning accuracies would be desirable, e.g., to align the bottom of the last swath to the top of the current swath to within +/− 0.0001 inch.

Figure 1:
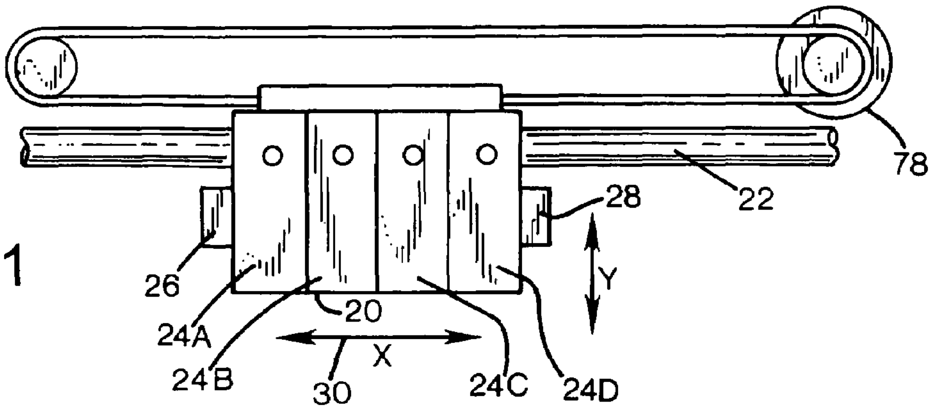
FIG. 1 is a diagrammatic view showing a printer carriage with sensors for detecting the edge of the prior swath.

In accordance with aspects of this invention, high positioning accuracy can be achieved by measuring the bottom of the last swath with a sensor located on the carriage. In order to have bi-directional printing, a sensor is placed on both sides of the carriage. This arrangement is illustrated in FIG. 1, which illustrates a carriage 20 mounted for sliding movement along a carriage rod 22. The carriage supports a plurality of ink jet pens 24A–24D having nozzles arrays for ejecting droplets of ink as the carriage is moved along the swath axis 30. Mounted at each side of the carriage are respective sensors 26, 28. As the carriage is traveling across the page, i.e., along the X axis, the carriage location along the Y axis can be adjusted on the fly to compensate for positioning errors of the media advance system, e.g. +/− 0.001 inch positioning errors, to a much smaller range, e.g. to within +/− 0.0001 inches. Of course, it is to be understood that the magnitudes of the particular positioning errors will be dependent on the particular system design.

Since the correction required in many applications is less than a few thousandths of an inch, it can be accomplished, e.g., with a servo controlled piezoelectric apparatus, pneumatic cylinder, motor with cam-actuator or linear actuator, or a solenoid wedge actuator. This final correction move can be done by moving the carriage, the individual pens, the carriage rod, the carriage plate, the drive roller shaft, the paper path module, or at other locations that affect pen to paper relative positions.

The advantages of making a final adjustment of pen to paper alignment on the fly are several fold. The error for "final positioning on the fly" is independent of the length of swath advance, whereas for all previous techniques, for swath advance, the error is directly proportional to the length of swath advance. Consider the example of a printer with a 0.5 inch swath advance, and a typical tolerance of +/− 0.001 inch for a 0.5 inch move. The maximum error is 0.2% of a 0.5 inch move. Now consider a printer having a 2 inch swath advance and a positioning requirement of +/− 0.0001 inch. The required maximum error is only 0.005% of a full swath move. For a 2 inch move, a 0.2% error would position the paper within +/− 0.004 inch, and this could be achieved by known media advance systems. The final 0.004 inch error can be compensated by the "final positioning on the fly" technique. This requires a final positioning accuracy of only +/− 2.5%. For longer swath advances, there are not only errors in Y position but also in Theta-Z. The "final positioning on the fly"technique can also compensate for this paper skew by adjusting for the swaths not being parallel.

Figure 2A:
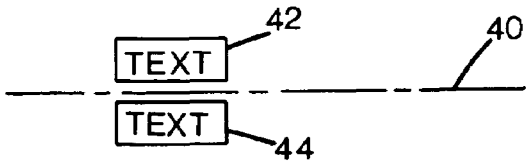
FIGS. 2A–2C illustrate respective image examples with low to high swath alignment accuracy requirements.
Figure 2B:
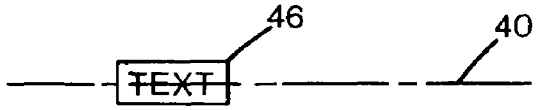
Figure 2C:
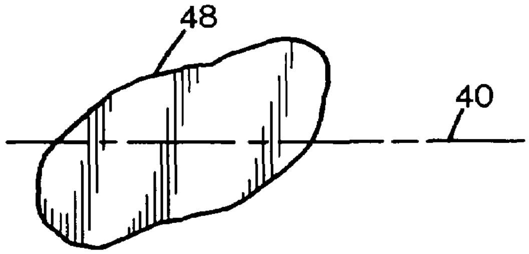

In zones where there is white space between swaths, i.e. in which there are blank, unprinted space between swaths, the positioning accuracy requirements are substantially reduced. Since the image to be printed is known, it is also known where it is critical to match top and bottom edge of swaths. It is only critical to align where there is a match and thus a signal is available to do the match. This is illustrated in FIGS. 2A–2C. FIG. 2A illustrated diagrammatically the case in which the swath boundary 40 falls between two blocks or lines of text, indicated as text 42 and 44, with space between the boundary and adjacent portions of the text. For this case, the alignment of one swath to the next swath is not critical. FIG. 2B illustrates the case in which the swath boundary 40 passes through a block or line of text 46. Here, the alignment between successive swaths is somewhat critical. FIG. 2C illustrates the case in which the swath boundary 40 passes through a graphical or solid image 48. For this case, the alignment between the adjacent swaths is very critical for high image quality.

In accordance with an aspect of the invention, the edge of the last swath is sensed, and compensation is achieved by moving either the paper or the pens, using the position information regarding the edge of the last swath. The preferred embodiment is to move the pens by either moving the carriage with respect to the carriage rod or the carriage rod with respect to the printing platen.

Gross or accumulated errors can be compensated during paper advances, i.e. by use of the media advance system, by commanding larger or smaller advances in comparison to the nominal advance distance. Minor errors can be compensated via carriage/pen servoing. The range of "on the fly" compensation is limited to some relatively small range, say for the sake of example +/− 0.01 inch. If there is an error of say 2 mils in each swath advance, it would only take 5 advances to take up all of the "on the fly" range of compensation. Therefore, by knowing an average error for each advance, which can be measured "on the fly" by the sensor, the next media advance could be commanded to be larger/smaller than the nominal advance distance to compensate.

FIG. 3 illustrates the location on the image at which the sensor 28 carried by the carriage 20 will be activated to sense the edge, as the carriage transports the sensor in the direction indicated by arrow 40A. The sensor 28 will be deactivated after the sensor reaches location 40B, where the previously printed image ends. Since the printer controller knows the location of the edges (along the Y axis) of the just printed edges, the locations at which the sensor needs to be activated and deactivated are known. Of course, the sensor could alternatively be activated continuously during a swath.

FIGS. 4A–4C illustrate three types of swath errors. FIG. 4A illustrates a linear swath error, wherein the second swath is offset from its nominal position relative to the first swath by an error $\Delta$Y1=$\Delta$Y2 across the width of the swath. Linear swath errors can be compensated down the page with a combination of pen servo and subsequent compensation during media advances.

Skew or rotational error, illustrated in FIG. 4B, wherein $\Delta$Y1 does not equal $\Delta$Y2, can accumulate down the page and compensation would be limited to the range of the pen/carriage servo. This type of error has been common with previous inkjet printers using a drive tire arrangement. Use of a belt drive would reduce this type of error.

Any remaining nonlinearities across the page, such as those illustrated in FIG. 4C, can be "straightened out" over several swaths. Since the swath should be straight, the tracking algorithm can aim to minimize deviations gradually enough to handle or minimize print defects.

Figure 5A:
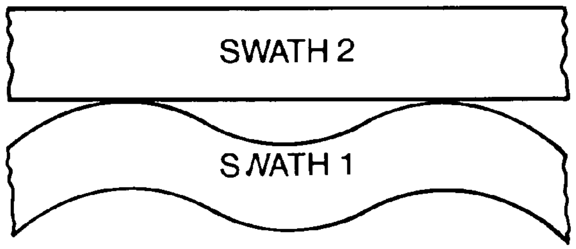
FIGS. 5A–5C illustrate types of swath printing compensation techniques for addressing swath errors.
Figure 5B:
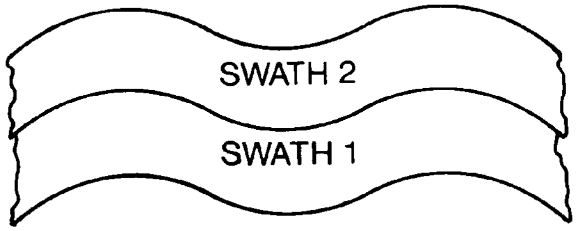
Figure 5C:
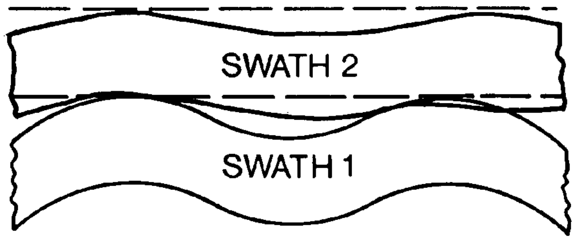

One pass straightening, depicted in FIG. 5A, would produce print defects. Tracking from one swath to the next, as shown in FIG. 5B, could emphasize defects further down the page. Hybrid compensation, melding the techniques of FIGS. 5A and 5B, minimizes print defects and will tend to straighten swaths after several passes.

Figure 6:
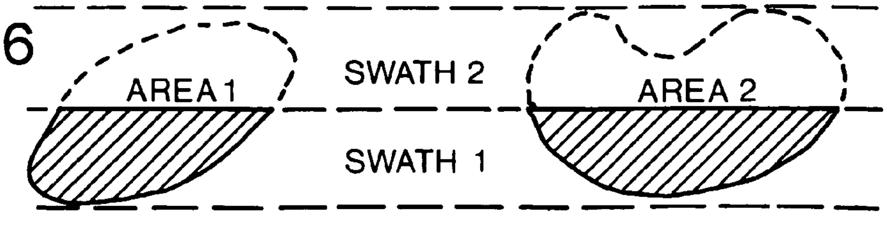
FIG. 6 illustrates the partial image fill areas in which high swath accuracy is necessary.

Swath tracking works well where there is continuous fill on the previous swath. Swath tracking works also on non-continuous previous swaths. Since it is known where the filled areas of the previous swath are, the tracking is turned on in those areas only. FIG. 6 illustrates the case in which the image includes non-continuous areas 1 and 2 of solid fill. Since the critical alignment areas are those of the solid fill areas, the tracking to detect the edge of the previous swath can be turned on or activated only for these areas.

There are several possible techniques for tracking. The preferred embodiment involves a pair of CCD arrays, one on each side of the carriage for bi-directional printing, as generally illustrated in FIG. 1. Consider the example in which the media positioning system without tracking can position the media within approximately 0.001 inch for a one half inch swath, and can position the media within approximately 0.004 inch on a 2 inch swath. For this example, the CCD array need only be about 0.010 inch tall and at a minimum one pixel wide. An array as small as one by one hundred pixels would provide adequate resolution for tracking. Arrays wider than one pixel could provide better resolution and accuracy. The size of the array is therefore determined by the required resolution and accuracy of a particular application.

Since the compensation for position is small, on the order of 0.004 inch for this example, the "servo"or actuating element could be as simple and lightweight as a piezoelectric driver on the carriage, or as simple as a DC motor driving a cam mounted to a carriage rod. Individual pen datums could also incorporate a piezoelectric element. In general, the actuating element could be a piezoelectric element, a pneumatic or hydraulic cylinder, a motor with a linear actuator or a cam actuator, a solenoid, a wedge actuated by any of these active devices, or other actuation structure.

Figure 7:
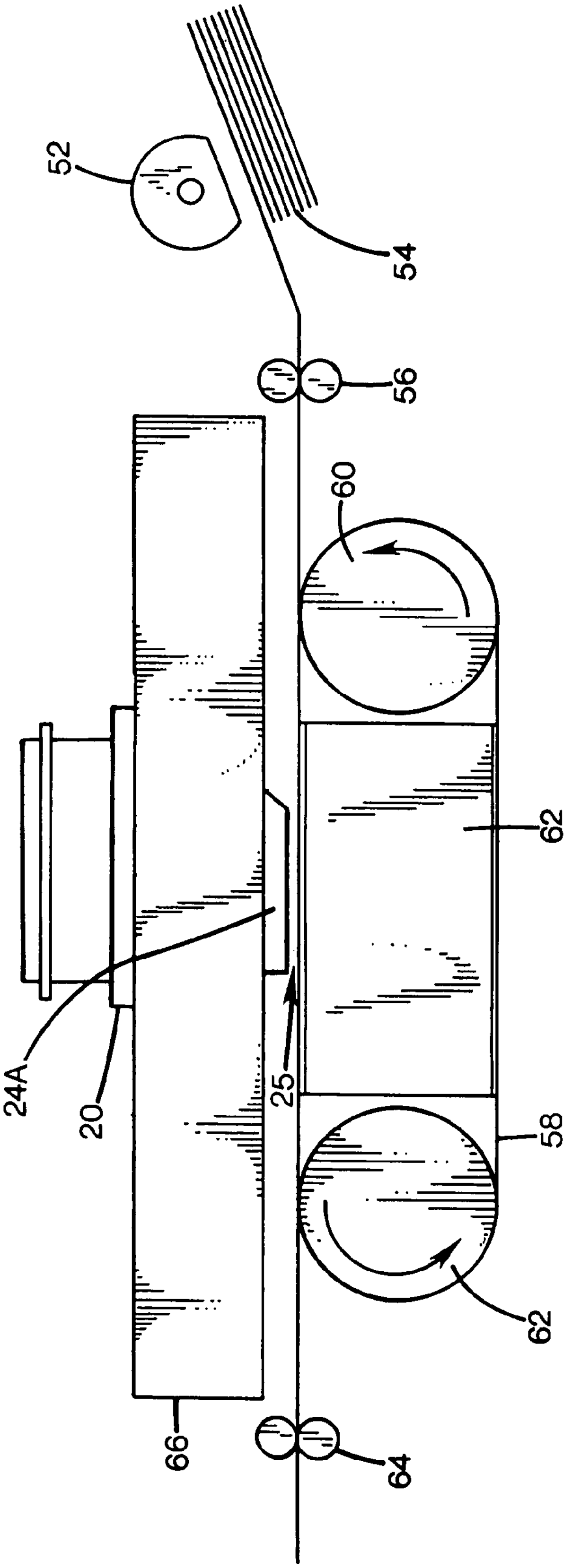
FIG. 7 is a simplified diagrammatic side view of the media path and media advance elements of a printer embodying this invention.

FIG. 7 is a simplified diagrammatic side view of an exemplary printer 50 with one possible form of media advance apparatus. The printer includes a frame 66 which supports the carriage drive and the carriage 20. A motor driven pick roller 52 is activated to pick a sheet of the print media from an input source 54, and pass it into the nip between drive roller set 56. The print media may be any type of suitable material, such as paper, cardstock, transparencies, photographic paper, fabric, mylar, metalized media, and the like, but for convenience, the illustrated embodiment is described using paper as the print medium. The invention is also applicable to roll-fed media as well. The sheet is advanced onto an endless perforated belt 58, mounted for rotation on belt pulleys 60, 62. The pulleys are driven to advance the sheet to the print zone 25 under the pens 24A–24D. A vacuum plenum 62 holds the sheet tightly against the belt surface at the print zone. The exiting sheet is passed through the nip formed by output roller set 64 to an output tray (not shown in FIG. 7). Of course, the invention is not limited to the specific form of media advance apparatus. Other media advance systems could be employed, e.g. friction roller drives.

Figure 8:
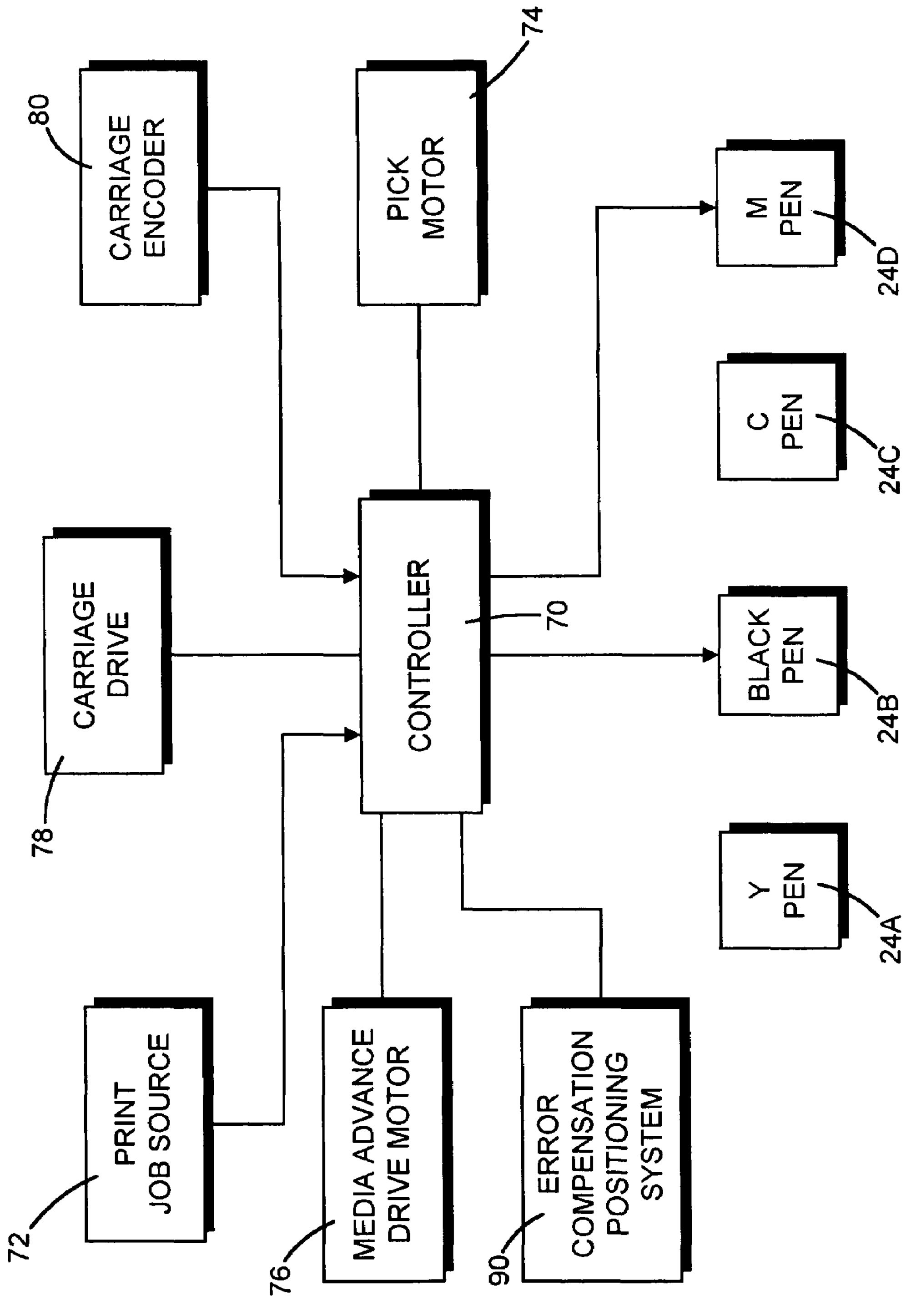
FIG. 8 is a schematic block diagram of the printer of FIG. 7.

FIG. 8 is a schematic block diagram of the control system for the printer of FIG. 7. A controller 70 such as a microcomputer or ASIC receives print job commands and data from a print job source 72, which can be a personal computer, digital camera or other known source of print jobs. The controller acts on the received commands to activate the pick roller motor 74 to pick a sheet from the input tray 54, advance the sheet to the nip between the drive roller and pinch roller set 56, and activate the drive motor system 76 to advance the sheet onto the belt, and move the belt to advance the sheet to the print zone. The carriage drive 78 is driven by the controller to position the carriage 20 for commencement of a print job, and to scan the carriage along the slider rod 28. As this is done firing pulses are sent to the printheads comprising the pens 26A–26D. The controller receives encoder signals from the carriage encoder 80 to provide position data for the carriage. The controller is programmed to advance incrementally the sheet to position the sheet for successive swaths using the media advance belt drive, and to finely position the print media and pen in relation to one another using an error compensation positioning system 90. The controller ejects the completed sheet into the output tray upon completion of printing.

Exemplary techniques for effecting the fine position compensation will be discussed further below.

Figure 9A:
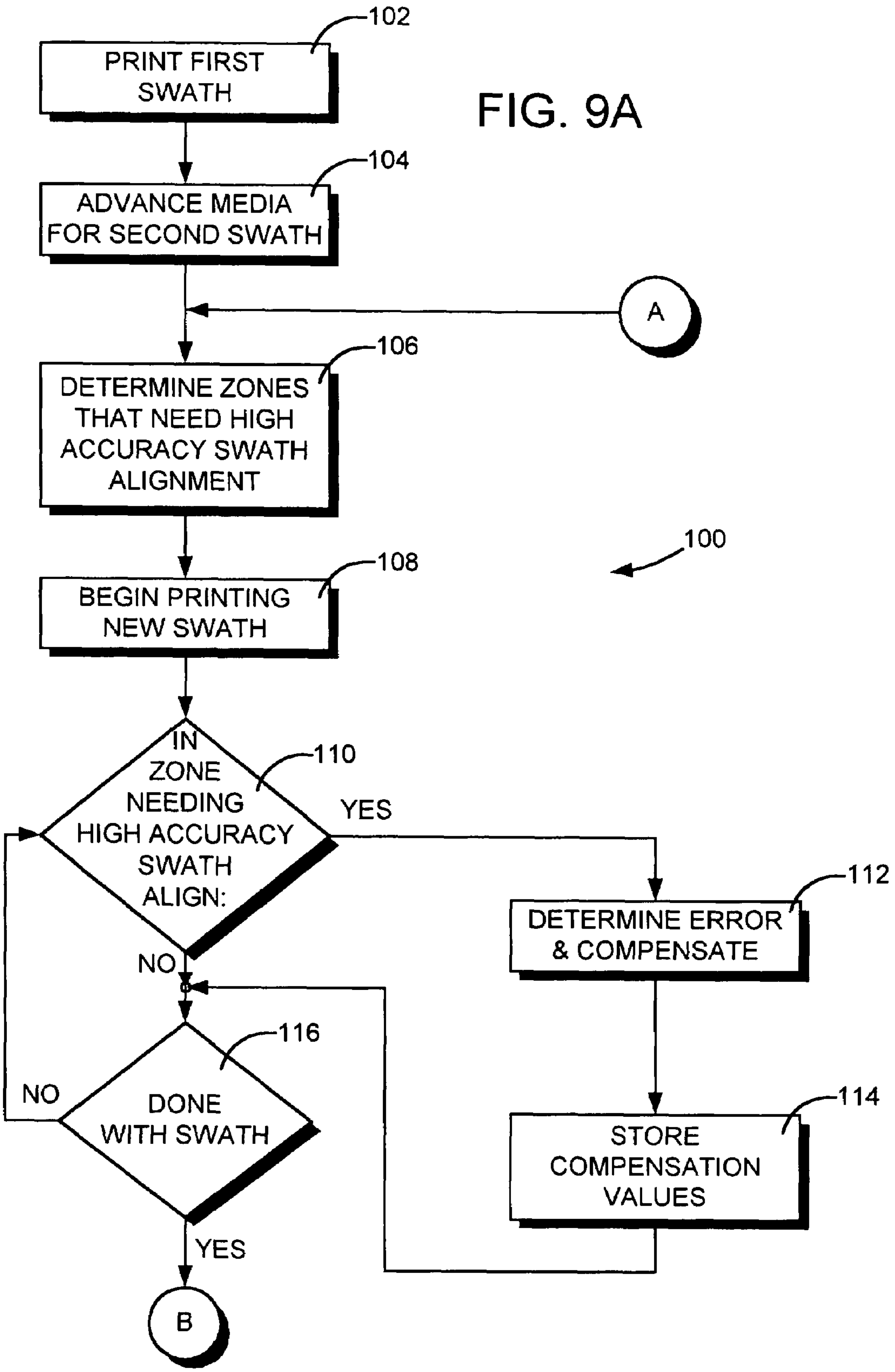
FIGS. 9A–9B and 10 illustrate an exemplary process flow diagram of an exemplary swath position correction technique in accordance with this invention.
Figure 9B:
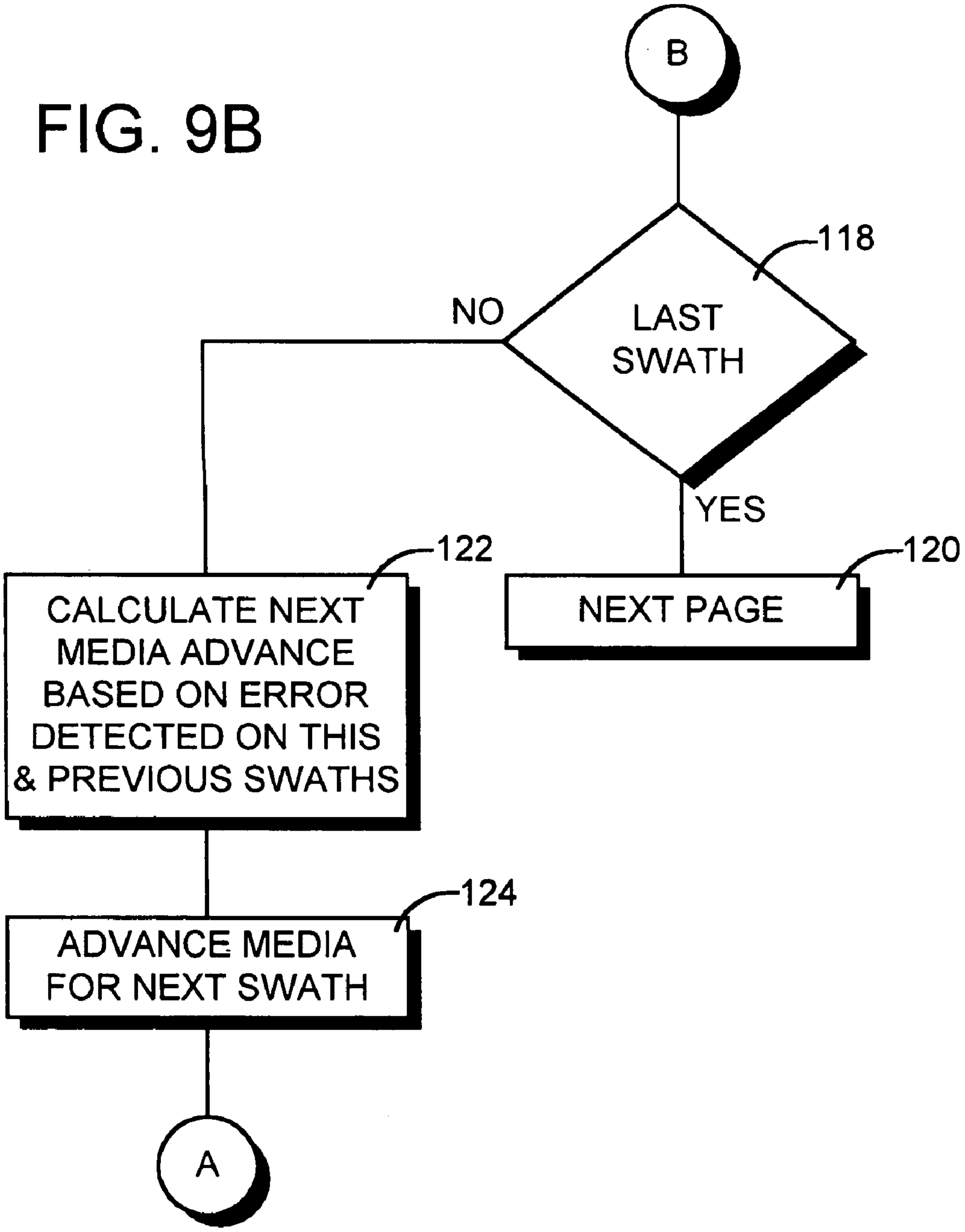

FIGS. 9A–9B illustrate steps of a flow diagram of an exemplary process 100 for high accuracy swath advances in a swath printer. The first swath is printed (102), and the media is advanced for the second swath using the media advance system (104). At 106, the zones that need high accuracy swath alignment are determined, based on the type of image and the print quality requested (e.g., draft mode, high resolution, etc.). At 108, printing of the next swath is commenced. During the printing of the swath, if in a zone needing high accuracy swath alignment (110), the error compensation needed is determined and applied to effect the compensation (112), and the compensation values are stored in memory (114). The process continues until the swath printing is completed (116). Referring now to FIG. 9B, If the just completed swath is the last swath for the page (118), operation proceeds to print the next page (if any), which involves ejecting the sheet just printed to an output location, loading a fresh sheet, and positioning the new sheet to commence printing the first swath, at which time the process 100 is repeated.

Figure 10:
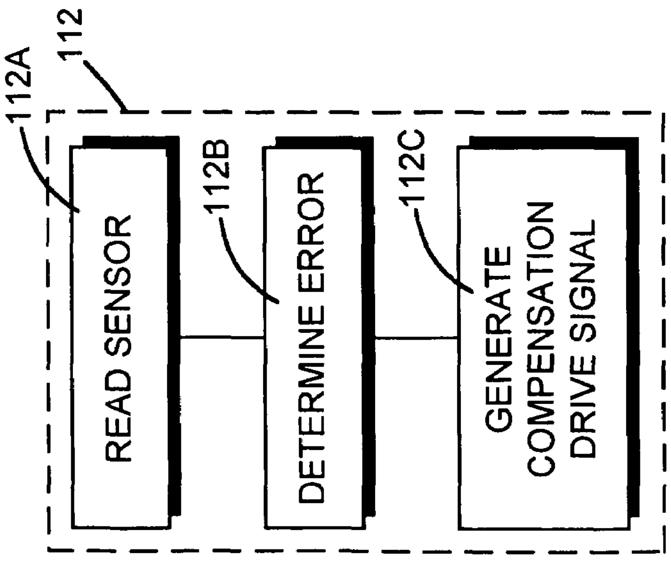

FIG. 10 illustrates in further detail the process step 112 of FIG. 9A. At 112A, the sensor is read to determine the position of the edge of the last swath. The error is determined at 112B, and at 112C, the appropriate compensation drive signal is generated and applied to the compensation apparatus.

Figure 11:
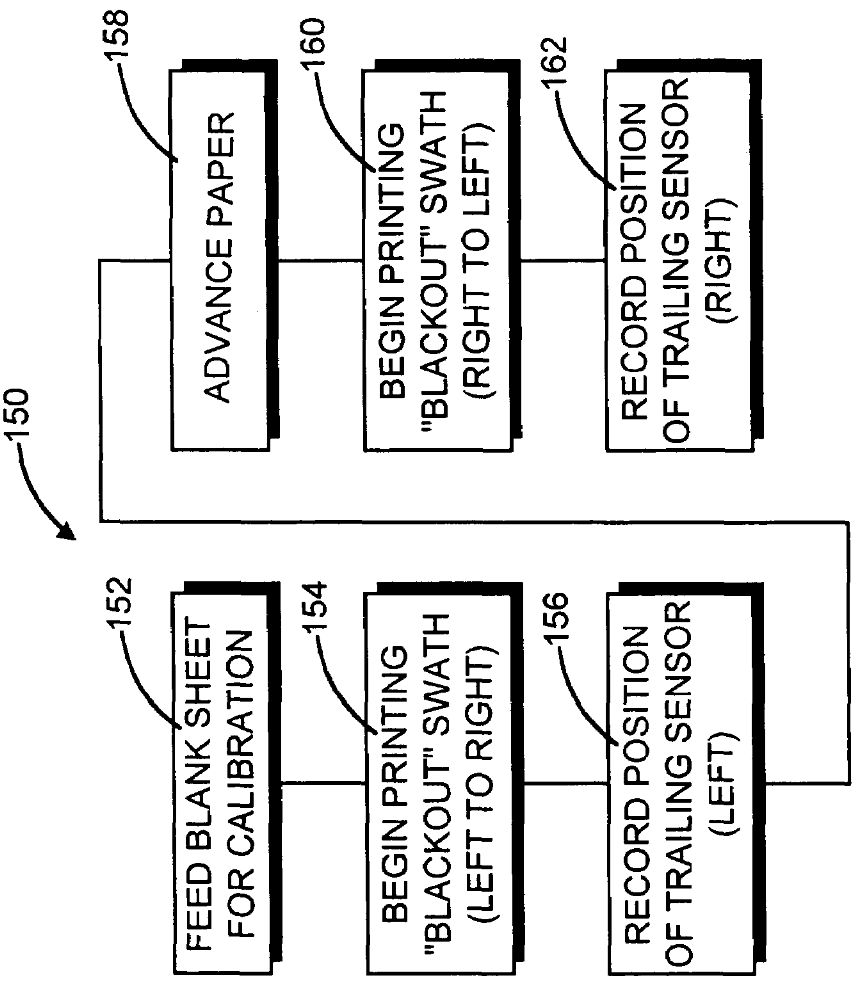
FIG. 11 illustrates an exemplary sensor calibration mode for the printer.

Preferably, the printer will include a calibration mode for calibrating the swath edge sensors. An exemplary calibration process 150 is shown in FIG. 11. A blank sheet is fed to the print zone for use in the calibration process at 152. A "blackout" swath is printed across the sheet, from left to right, at 154; the blackout swath has only a dark strip along the top of the swath, say 0.01 inch thick. At step 156, the position of the trailing (left) sensor is recorded to calibrate the top of the swath with the left sensor. The sheet is advanced at 158, and second blackout swath is then printed, from right to left, at 160. The position of the trailing (right) sensor is then recorded at 162, calibrating the top of the swath with the right sensor. Thus, the calibration process employs the trailing sensor. During printing the leading sensor is typically used to align the bottom of the last swath printed with the top of the current swath. For a multiple-pen printer, each pen could be calibrated relative to the sensor, thus repeating the calibration steps (154–162) for each pen.

Figure 12:
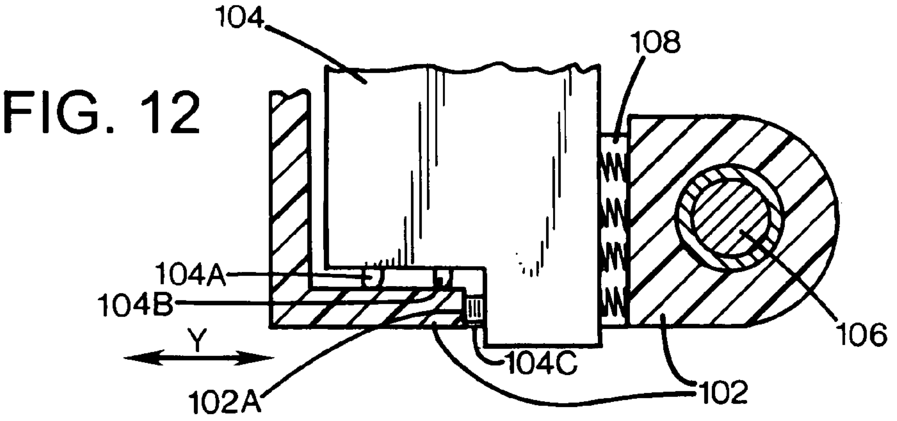
FIG. 12 is a diagrammatic side view of an apparatus for effecting position correction by moving the printer pens in relation to the printer carriage.

Several alternate means for effecting relative movement between the pens and the print media to provide fine position compensation are illustrated in FIGS. 12–17. FIG. 12 illustrates a technique for providing pen-to-carriage position compensation. Shown in cross-section is a carriage structure 102 holding one or more ink jet pens 104, and mounted for sliding movement along slider rod 106. The pen position in the carriage is registered by pen datum surfaces 104A and 104B, and by piezoelectric device 104C which also acts as a datum. Spring contacts 108 bias the position of the pen away from the rod, bringing the device 104C against the carriage shoulder surface 102A. The device 104C is driven by the printer controller to modify the pen position along the Y axis. Typically, for a color printer there will be a plurality of pens held in the carriage, and each will have a piezoelectric element to modify its position within the carriage. Alternatively, the element 104C could include another type of positioning element or apparatus, such as a solenoid, a pneumatic or hydraulic actuator, a cam, or other commonly used positioning apparatus. Piezoelectric actuators suitable for the purpose are known in the art; by way of example only, piezoelectric actuators and translators are marketed by Micro Pulse Systems, Inc., Santa Barbara, Calif., and by PiezoMech Incorporated.

Figure 13:
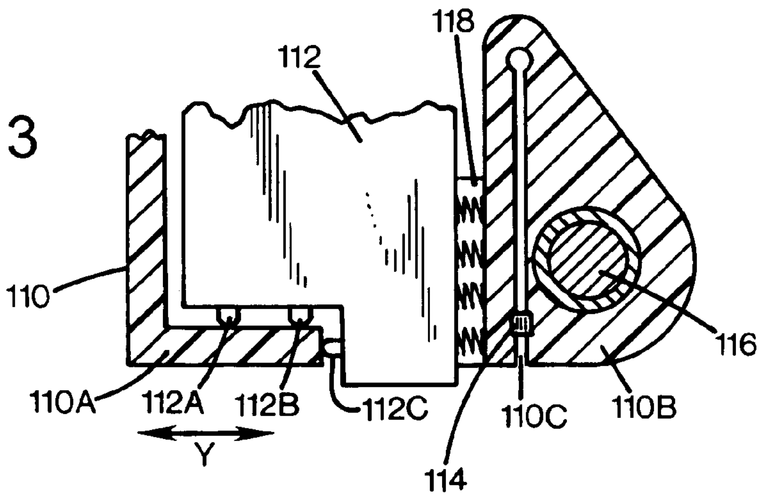
FIG. 13 is a diagrammatic side view of an apparatus for effecting position correction by moving the carriage in relation to the carriage rod.
Figure 14:
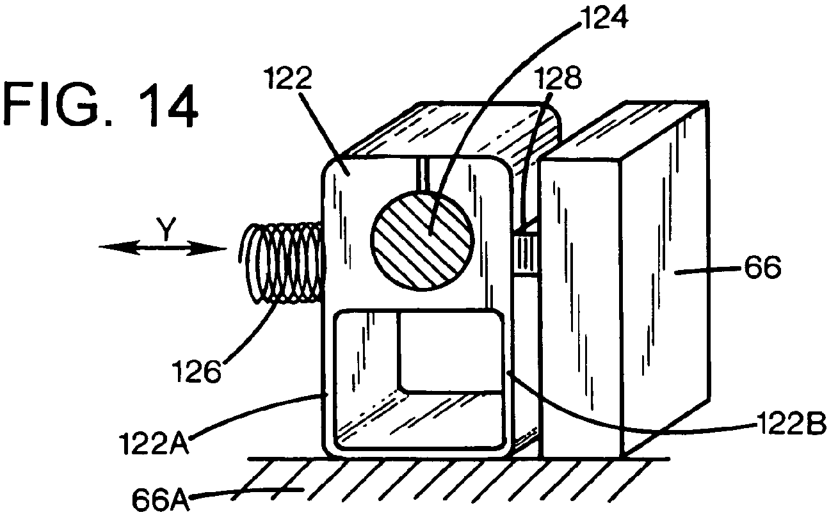
FIG. 14 is a diagrammatic side isometric view of an apparatus for effecting position correction by moving the carriage rod in relation to the printer frame.

FIG. 13 illustrates a technique for providing carriage-to-carriage-rod fine position compensation. This will effect movement for all pens mounted in the carriage 110, shown in cross-section, with exemplary pen 112 visible in FIG. 13. The carriage is mounted on rod 116 for sliding movement. The carriage includes a carriage stall portion 110A which is cantilevered from carriage rod portion 110B; a gap 110C is formed between the two portions. The pens include datums 112A, 112B and 112C. Spring contacts 118 urge the pen in registered position within the carriage as determined by the datums against corresponding carriage surfaces. To achieve fine position compensation between the rod 116 and the carriage portion 110A, a position control device 114 such as a piezoelectric device is placed in the gap 110C. Driving the device will cause movement of the carriage portion 110A relative to the rod 116. FIG. 14 is a diagrammatic illustration of a fine position compensation technique which achieves pen to media position control by providing relative movement of the carriage rod in relation to the printer frame 66. The slider rod 124 is mounted at each rod end on a rod mount, one of which is shown in FIG. 14 as rod mount 122. The rod mount is secured to frame portion 66A, and includes thin flexible beam members 122A, 122B. A spring structure 126 exerts a bias force pushing the rod mount against an actuator element 128.

The rod 124 can be moved in the Y axis by actuating element 128, to cause the beams to flex, moving the mount against the bias force. The actuating element could be a piezoelectric element, a pneumatic or hydraulic cylinder, a motor with a linear actuator or a cam actuator, a solenoid, a wedge actuated by any of these active devices, or other actuation structure.

Figure 15:
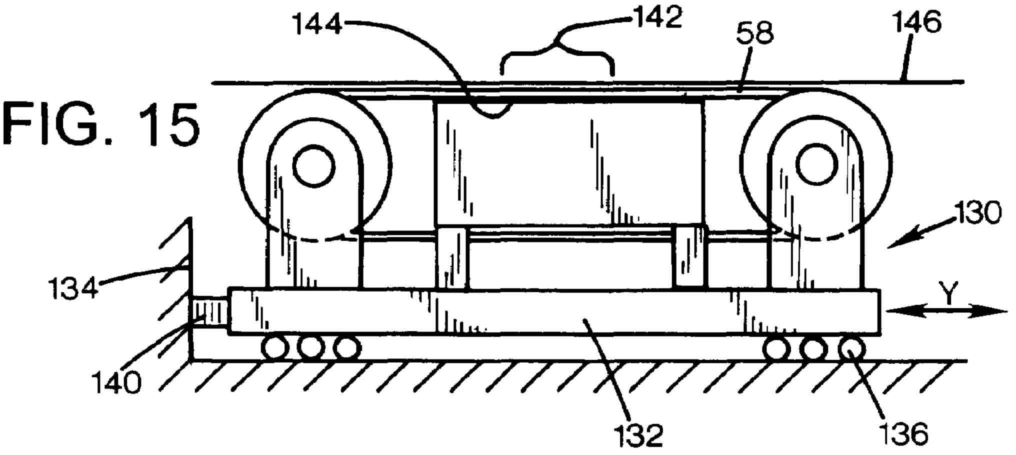
FIG. 15 is a diagrammatic side view of an apparatus for effecting position correction by moving the printer platen in relation to the printer frame.

Another technique for providing fine position compensation in accordance with the invention is to position the printer platen relative to the printer frame. This technique is illustrated in FIG. 15, a simplified diagrammatic side view showing the media advance system 130 including a drive belt 58 as in the system of FIG. 7, mounted on a slidable support table 132 which slides on bearings 136 relative to frame 134 along the Y axis. The position of the table is controlled by actuator 140, which can be a piezoelectric actuator, or another actuator type as described above with respect to the embodiment of FIG. 14. The print medium is located on the media advance system at the print zone 142 under the printer pens. In this embodiment, the printer platen 144, and its position and that of the print medium 146 held thereon, is movable in response to actuation of the element 140.

Figure 16:
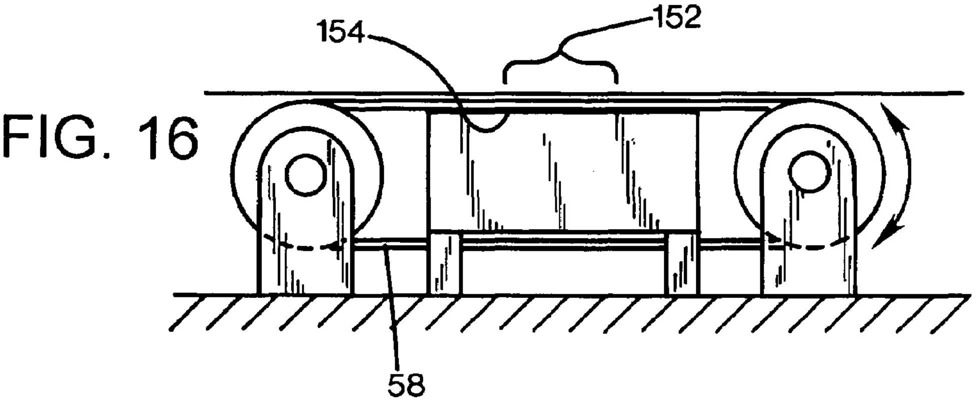
FIG. 16 is a diagrammatic side view of an apparatus for effecting position correction by moving the print medium in relation to the printer platen.

FIG. 16 shows an exemplary technique for providing relative movement between the print medium and the printer platen by moving the print medium relative to the platen. The media advance system includes a belt 58 and belt drive as described with respect to FIG. 7. With the print media held against the platen 154 at the print zone 152 by a vacuum hold-down, the media drive is actuated to provide incremental rotation of the drive belt, thus moving the print medium relative to the platen. For this embodiment, the fine compensation movement can be accomplished via a second drive motor system that has a very high, but precise gear reduction. Another technique is to mount the main drive motor to a plate that rotates coaxially relative the motor shaft. The main motor moves a commanded position (say +/− 5 mils) and then its position is locked relative to the plate using a brake. The second motor then rotates the plate to achieve fine compensation.

Figure 17:
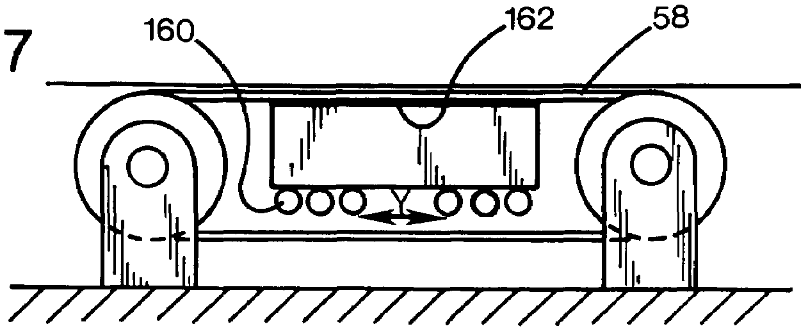
FIG. 17 is a diagrammatic side view of an apparatus as in FIG. 16, but allowing movement of the platen during position correction.

In the embodiment of FIG. 16, the platen is stationary. Alternatively, the platen can be mounted on a slide arrangement. This is illustrated in FIG. 17, with the platen 162 moving with the belt 58 and the print medium when the media advance system is incrementally advanced with the vacuum hold-down actuated, effecting the fine position compensation. The media advance system has a main motor which coarsely positions the belt with the platen in a locked position. The platen is then unlocked, the main motor is disengaged, and the platen is incrementally moved to achieve fine compensation, with a vacuum holding the belt to the platen.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for high accuracy media positioning in a swath printer, comprising:

mounting a computer-controlled printing element for movement along a swath axis for swath printing of an image on a print medium;

moving the printing element along the swath axis and printing at least a portion of a swath of the image on the print medium;

activating a media advance mechanism to provide a nominal advance movement between the printing element and the print medium to position for a fresh swath;

moving the printing element along the swath axis;

sensing the position of an edge of a just printed portion of said image which is nominally aligned with the scan axis, wherein said edge is a bottom edge of a previously printed swath in relation to a direction of print medium advance through the swath printer past the printing element;

providing relative motion between the print medium and the printing element to accurately position the printing element in dependence on the sensed position of the edge of the just printed portion of the image to align the top edge of the next swath to be printed in relation to the bottom edge of the previously printed swath, wherein said step of providing relative motion is carried out on the fly as the portion of the image is being printed and the print element is moving in the scan axis.

2. The method of claim 1 wherein said step of providing relative motion between the print medium and the printing element is performed simultaneously with the step of moving the printing element along the swath axis to print at least a portion of the fresh swath.

3. The method of claim 1 wherein:

said providing relative motion between the print medium and the printing element is performed after printing a swath and before said moving the printing element along the swath axis to print at least a portion of a next swath.

4. The method of claim 1 wherein the step of providing relative motion between the print medium and the printing element includes incrementally moving the print medium in a direction transverse to the scan axis.

5. The method of claim 1 wherein the printing element includes an ink-jet pen.

6. A method for high accuracy media positioning in a swath printer, comprising:

mounting a computer-controlled printing element for movement along a swath axis for swath printing of an image on a print medium;

moving the printing element along the swath axis and printing at least a portion of a swath of the image on the print medium;

sensing the position of an edge of the just printed portion of said image which is nominally aligned with the scan axis;

providing relative motion between the print medium and the printing element to accurately position the printing element in dependence on the sensed position of the edge of the just printed portion of the image, said providing relative motion comprising moving the printing element in a direction transverse to the swath axis.

7. The method of claim 6 wherein said step of mounting said printing element includes mounting the printing element in a movable carriage, and said moving the printing element in a direction transverse to the swath axis includes:

positioning an actuating element between the printing element and the carriage; and driving the actuating element to move the printing element to obtain the accurate positioning.

8. The method of claim 6 wherein said step of mounting the printing element includes mounting the printing element in a carriage for sliding movement along a slider rod, and said moving the printing element in a direction transverse to the swath axis includes:

positioning an actuating element between the slider rod and the carriage; and driving the actuating element to move the carriage and the printing element to obtain the accurate positioning.

9. The method of claim 6 wherein said step of mounting the printing element includes mounting the printing element in a carriage for sliding movement along a slider rod, and said moving the printing element in a direction transverse to the swath axis includes:

positioning an actuating element between the slider rod and a corresponding slider supporting structure; and driving the actuating element to move the slider rod and with it the carriage and the printing element to obtain the accurate positioning.

10. A method for high accuracy media positioning in a swath printer, comprising:

mounting a computer-controlled printing element for movement along a swath axis for swath printing of an image on a print medium;

moving the printing element along the swath axis and printing at least a portion of a swath of the image on the print medium;

sensing the position of an edge of the just printed portion of said image which is nominally aligned with the scan axis;

providing relative motion between the print medium and the printing element to accurately position the printing element in dependence on the sensed position of the edge of the just printed portion of the image, said providing relative motion between the print medium and the printing element including mounting an actuating element between each said printing element and said carriage; and actuating each of said actuating elements to move the respective printing elements in a direction transverse to the swath axis.

11. A swath printer, comprising:

a computer-controlled printing structure;

a carriage for holding the printing structure, said carriage mounted for movement along a swath axis at a print area for swath printing of an image on a print medium;

a carriage drive system for driving the carriage along the swath axis;

an optical sensor system mounted to the carriage for sensing the position of a bottom edge of a just printed portion of said image which is nominally aligned with the scan axis;

a media advance system for moving the print media along a media path and past the print area;

a fine positioning system for providing incremental relative motion between the print medium and the printing element to accurately position the printing element to align the top edge of a to-be-printed image portion in relation to the just printed portion in dependence on the sensed position of the bottom edge of the just printed portion of the image.

12. The printer of claim 11, wherein said fine positioning system is actuated to provide relative motion to accurately position the printing element in relation to the print medium between printing successive swaths.

13. The printer of claim 11, wherein said fine positioning system is actuated to provide relative motion to accurately position the printing element in relation to the print medium simultaneously as the printing structure is moved along the swath axis.

14. The printer of claim 11 wherein said fine positioning system provides relative motion between the print medium and the printing element by moving the printing element in a direction transverse to the swath axis.

15. The printer of claim 14, wherein said fine positioning system includes an actuating element between the printing structure and the carriage to move the printing structure to obtain the accurate positioning.

16. The printer of claim 14, wherein said carriage is mounted for sliding movement along a slider rod mounted to a slider rod support structure, and said fine positioning system includes an actuating element disposed between the slider rod and the slider rod support structure to move the slider rod and with it the carriage and the printing element.

17. The printer of claim 14, wherein said carriage is mounted for sliding movement along a slider rod, and said fine positioning system includes an actuating element disposed between the slider rod and the carriage to move the carriage and the printing structure to obtain the accurate positioning.

18. The printer of claim 14 wherein the fine positioning system incrementally moves the print medium in a direction transverse to the scan axis.

19. The printer of claim 11 wherein the printing structure includes an ink-jet pen.

20. The printer of claim 11 wherein the printing element includes a plurality of ink-jet pens mounted in a carriage, and wherein said fine positioning system includes an actuating element mounted between each said pen and said carriage for moving the respective printing elements in a direction transverse to the swath axis.

21. The printer of claim 11 wherein said fine positioning system includes a piezoelectric actuator for providing the incremental relative motion.

22. The printer of claim 11 wherein the sensor system includes a first sensor mounted on a first side of the carriage and a second sensor mounted on a side of the carriage opposite the first side along the swath axis, the sensor system adapted for bidirectional sensing operation.

23. A method for swath printing, comprising:

printing a first swath of an image on a print medium with an ink-jet printing structure;

advancing the print medium to position the medium for printing a second swath;

determining zones of the second swath which need high accuracy swath alignment;

begin printing the second swath;

during said printing of the second swath, for those zones which need high accuracy swath alignment, determine the alignment errors and store in memory appropriate error compensation values;

after completing the printing of said second swath, calculate the next media advance distance based on the stored compensation values; and advancing the media for the next swath to be completed by a distance dependent on said next media advance distance.

24. A method for high accuracy media positioning in a swath printer, comprising:

providing a print medium;

providing a computer-controlled printing element, the printing element mounted for movement along a swath axis to print a first swath on the print medium;

moving the printing element along the swath axis and printing at least a portion of a swath on the print medium, said swath having a leading edge and a trailing edge;

providing relative motion between the printing element and the print medium to position for a fresh swath;

sensing the position of the trailing edge of the just printed swath;

providing relative motion between the print medium and the printing element to accurately position for the fresh swath in dependence on the sensed position of the trailing edge of the just printed swath to compensate for position errors between a nominal position of the trailing edge and the sensed position of the trailing edge of the just printed swath; and moving the printing element along the swath axis to print at least a portion of the fresh swath;

wherein said step of sensing the position of the trailing edge and said step of providing relative motion between the print medium and the printing element is performed simultaneously with the step of moving the printing element along the swath axis to print at least a portion of the fresh swath.

25. The method of claim 24 wherein providing relative motion between the print medium and the printing element to accurately position for the fresh swath includes:

moving the printing element in a direction transverse to the swath axis.

26. The method of claim 25 wherein said moving the printing element in a direction transverse to the swath axis includes:

positioning a piezoelectric element between the printing element and the carriage; and driving the piezoelectric element to move the printing element to obtain the accurate positioning.

27. A method for high accuracy media positioning in a swath printer, comprising:

mounting a computer-controlled printing element for movement along a swath axis for swath printing of an image on a print medium;

moving the printing element along the swath axis and printing at least a portion of a swath of the image on the print medium;

sensing the position of an edge of the just printed portion of said image which is nominally aligned with the scan axis;

providing relative motion between the print medium and the printing element on the fly as the portion of the image is being printed and the print element is moving in the scan axis to accurately position the printing element in dependence on the sensed position of the edge of the just printed portion of the image.

28. A printing method, comprising:

receiving a print job from a print job source, said print job consisting of text or a graphic image, or both a text and a graphic image;

mounting a computer-controlled printing element for movement along a swath axis for swath printing of the print job onto a print medium;

moving the printing element along the swath axis and printing at least a portion of a swath of the print job on the print medium;

activating a media advance mechanism to provide a nominal advance movement between the printing element and the print medium to position for a fresh swath;

moving the printing element along the swath axis;

sensing the position of an edge of a just printed portion of said print job swath which is nominally aligned with the scan axis, wherein said edge is a bottom edge of a previously printed swath in relation to a direction of print medium advance through the swath printer past the printing element;

providing relative motion between the print medium and the printing element to accurately position the printing element in dependence on the sensed position of the edge of the just printed portion of the print job to align the top edge of the next swath to be printed in relation to the bottom edge of the previously printed swath.

* * * * *

UNITED STATES PATENT AND TRADEMARK OFFICE

CERTIFICATE OF CORRECTION

PATENT NO. : 7,050,193 B1
APPLICATION NO. : 09/496451
DATED : May 23, 2006
INVENTOR(S) : Steven P Downing It is certified that error appears in the above-identified patent and that said Letters Patent is hereby corrected as shown below:

In column 10, line 13, in Claim 11, after “to the” insert -- bottom edge of the --.

Signed and Sealed this

Sixteenth Day of June, 2009

JOHN DOLL
*Acting Director of the United States Patent and Trademark Office*